(12) United States Patent
Jeon et al.

(10) Patent No.: US 10,790,558 B2
(45) Date of Patent: Sep. 29, 2020

(54) BATTERY MODULE

(71) Applicants: HYUNDAI MOTOR COMPANY, Seoul (KR); KIA MOTORS CORPORATION, Seoul (KR)

(72) Inventors: Yoon Cheol Jeon, Suwon-si (KR); Min Wook Kim, Yongin-si (KR); Dal Kim, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/830,944

(22) Filed: Dec. 4, 2017

(65) Prior Publication Data

US 2019/0051956 A1   Feb. 14, 2019

(30) Foreign Application Priority Data

Aug. 11, 2017  (KR) .......................... 10-2017-0102413

(51) Int. Cl.
  *H01M 10/6551*   (2014.01)
  *H01M 10/6556*   (2014.01)
  (Continued)

(52) U.S. Cl.
  CPC ..... *H01M 10/6551* (2015.04); *H01M 2/1077* (2013.01); *H01M 10/613* (2015.04);
  (Continued)

(58) Field of Classification Search
  CPC ............................................ H01M 10/60–667
  See application file for complete search history.

(56) References Cited

U.S. PATENT DOCUMENTS 5,756,227 A  *  5/1998  Suzuki ...................... F28F 3/02
                                                        429/120
2009/0258288 A1* 10/2009 Weber ..................... H01M 2/10
                                                        429/120
(Continued)

FOREIGN PATENT DOCUMENTS

JP   2013-051099 A    3/2013
KR   10-2016-0024187 A   3/2016
(Continued)

OTHER PUBLICATIONS

Extended European Search Report issued in Application No. 17205132 dated Jan. 15, 2018, 7 pages.

*Primary Examiner* — Jonathan G Leong
*Assistant Examiner* — Jacob Buchanan
(74) *Attorney, Agent, or Firm* — Morgan, Lewis & Bockius LLP

(57) ABSTRACT

A battery module includes: a cell cover close to a battery cell and having one surface emitting heat of the battery cell; and a cooling channel portion having a cooling channel that a refrigerant flows formed therein and having one surface of the cooling channel close to the one surface of the cell cover to absorb heat of the battery cell. In a contact region of the cell cover and the cooling channel portion, the cell cover has a protrusion portion protruded in the direction of the cooling channel, and the cooling channel has a penetration hole for inserting the protrusion portion into an inner portion that the refrigerant flows.

6 Claims, 3 Drawing Sheets

(51) Int. Cl.
*H01M 10/6568* (2014.01)
*H01M 10/6555* (2014.01)
*H01M 10/6554* (2014.01)
*H01M 10/613* (2014.01)
*H01M 10/647* (2014.01)
*H01M 10/6567* (2014.01)
*H01M 10/625* (2014.01)
*H01M 2/10* (2006.01)

(52) U.S. Cl.
CPC ....... *H01M 10/625* (2015.04); *H01M 10/647* (2015.04); *H01M 10/6554* (2015.04); *H01M 10/6555* (2015.04); *H01M 10/6556* (2015.04); *H01M 10/6567* (2015.04); *H01M 10/6568* (2015.04); *H01M 2220/20* (2013.01)

(56) References Cited

U.S. PATENT DOCUMENTS

| | | | |
|---|---|---|---|
| 2010/0279152 A1* | 11/2010 | Payne | H01M 10/0413 429/50 |
| 2011/0027640 A1* | 2/2011 | Gadawski | H01M 2/0212 429/120 |
| 2011/0059346 A1* | 3/2011 | Jeong | F28D 15/0266 429/120 |
| 2011/0104545 A1 | 5/2011 | Meintschel et al. | |
| 2011/0244299 A1 | 10/2011 | Guener et al. | |
| 2012/0088140 A1* | 4/2012 | Kardasz | H01M 4/13 429/120 |
| 2012/0171532 A1* | 7/2012 | Lee | H01M 10/6557 429/72 |
| 2012/0282506 A1* | 11/2012 | Hohenthanner | H01M 10/6557 429/99 |
| 2013/0022857 A1* | 1/2013 | Meintschel | H01M 10/647 429/120 |
| 2017/0200991 A1* | 7/2017 | Nam | H01M 10/6552 |

FOREIGN PATENT DOCUMENTS

| | | | | |
|---|---|---|---|---|
| WO | 2014/036227 A1 | 3/2014 | | |
| WO | WO2016171345 | * 10/2016 | ........ | H01M 10/6552 |

* cited by examiner

BATTERY MODULE

CROSS REFERENCE TO RELATED APPLICATION

The present application claims the benefit of priority to Korean Patent Application No. 10-2017-0102413 filed on Aug. 11, 2017, the entire content of which is incorporated herein for all purposes by this reference.

TECHNICAL FIELD

The present disclosure relates to a battery module, and more particularly, to a battery module for improving a structure of a water cooling system for controlling heat that generates in the battery module within a battery system, thereby enhancing thermal transfer efficiency.

BACKGROUND

An eco-friendly vehicle such as a hybrid vehicle and an electric vehicle and the like is mounted with a high-voltage battery capable of storing an electric energy and a cooling system for cooling a battery module within the high-voltage battery.

A battery system indirectly cools a battery cell using a water cooling plate constituting a cooling channel, instead of a direct contact method, in order to obtain an electrical insulation between the battery cell and cooling water.

In the related art, an interfacial thermal contact material interposed between the water cooling plate and a cell cover is applied to reduce a contact thermal resistance between the water cooling plate and the cell cover. However, in the case that surface roughness or processing flatness of a contact surface of the water cooling plate is not good, there has been a problem that inner bubbles occur due to non-uniform contact, thereby greatly occurring a contact thermal resistance between the water cooling plate and the cell cover.

Accordingly, there was a need for a solution enhancing thermal transfer efficiency between the water cooling plate and the cell cover and enhancing assembly productivity.

The foregoing is intended merely to aid in the understanding of the background of the present disclosure, and is not intended to mean that the present disclosure falls within the purview of the related art that is already known to those skilled in the art.

SUMMARY

The present disclosure is proposed for solving the above problems, and the present disclosure is intended to provide a battery module improving a structure of a water cooling system for controlling heat that generates in the battery module within a battery system, thereby enhancing thermal transfer efficiency.

A battery module according to the present disclosure for achieving the object is characterized by including a cell cover close to a battery cell and having one surface emitting heat of the battery cell; and a cooling channel portion having a cooling channel that a refrigerant flows formed therein and having one surface of the cooling channel close to the one surface of the cell cover to absorb heat of the battery cell, wherein in a contact region of the cell cover and the cooling channel portion, the cell cover has a protrusion portion protruded in the direction of the cooling channel and the cooling channel has a penetration hole for inserting the protrusion portion into an inner portion that the refrigerant flows.

The protrusion portion of the cell cover is characterized by having a structure bent as U or V and being inserted into the penetration hole to directly contact with the refrigerant.

The battery module is characterized by further including a gasket positioned along a circumference of the penetration hole of the cooling channel portion, wherein the gasket is compressed by contact of the cell cover and the cooling channel portion.

A battery module according to the present disclosure includes a cell cover having an upper surface, a side surface, and a lower surface formed to receive a battery cell and having a protrusion portion formed on the lower surface thereof; a cooling channel portion having a cooling channel that a refrigerant flows formed therein and having a penetration hole into which the protrusion portion of the cell cover is inserted formed on one surface of the cooling channel; and a gasket positioned along a circumference of the penetration hole of the cooling channel portion.

The lower surface of the cell cover is characterized by having one side portion forming the protrusion portion and inserted into the penetration hole of the cooling channel portion to directly contact with the refrigerant and having the other side portion contacting an outer surface of the cooling channel portion; and the gasket is characterized by being interposed and compressed between the other side portion of the cell cover and the outer surface of the cooling channel portion.

The protrusion portion is characterized by having a structure bent as U or V.

A battery module according to the present disclosure includes a cell cover having an upper surface, a lower surface, and a side surface formed to receive a plurality of battery cells, having a wall interposed between the battery cells, and having a plurality of protrusion portions formed on the lower surface thereof; and a cooling channel portion having a plurality of cooling channels that a refrigerant flows formed therein and having a penetration hole into which the protrusion portion of the cell cover is inserted formed on one surface of each of the cooling channels.

The protrusion portion of the cell cover is characterized by having a structure bent as U or V and being inserted into the penetration hole to directly contact with the refrigerant.

The battery module is characterized by further including a plurality of gaskets positioned along a circumference of each of the penetration holes of the cooling channel portion; and the gasket is characterized by being compressed by contact of the cell cover and the cooling channel portion.

According to the battery module of the present disclosure, it is possible to improve a structure of a water cooling system for controlling heat that generates in the battery module within a battery system, thereby enhancing the thermal transfer efficiency.

Further, it is possible to reduce power consumption by an air-conditioning load through the improvement of thermal transfer efficiency.

Further, it is possible to remove an interfacial thermal contact material between the water cooling plate and the cell cover, thereby enhancing assembly productivity and saving manufacturing costs.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION

Hereinbelow, a battery module according to various embodiments of the present disclosure will be described in detail with reference to the accompanying drawings.

Figure 1:
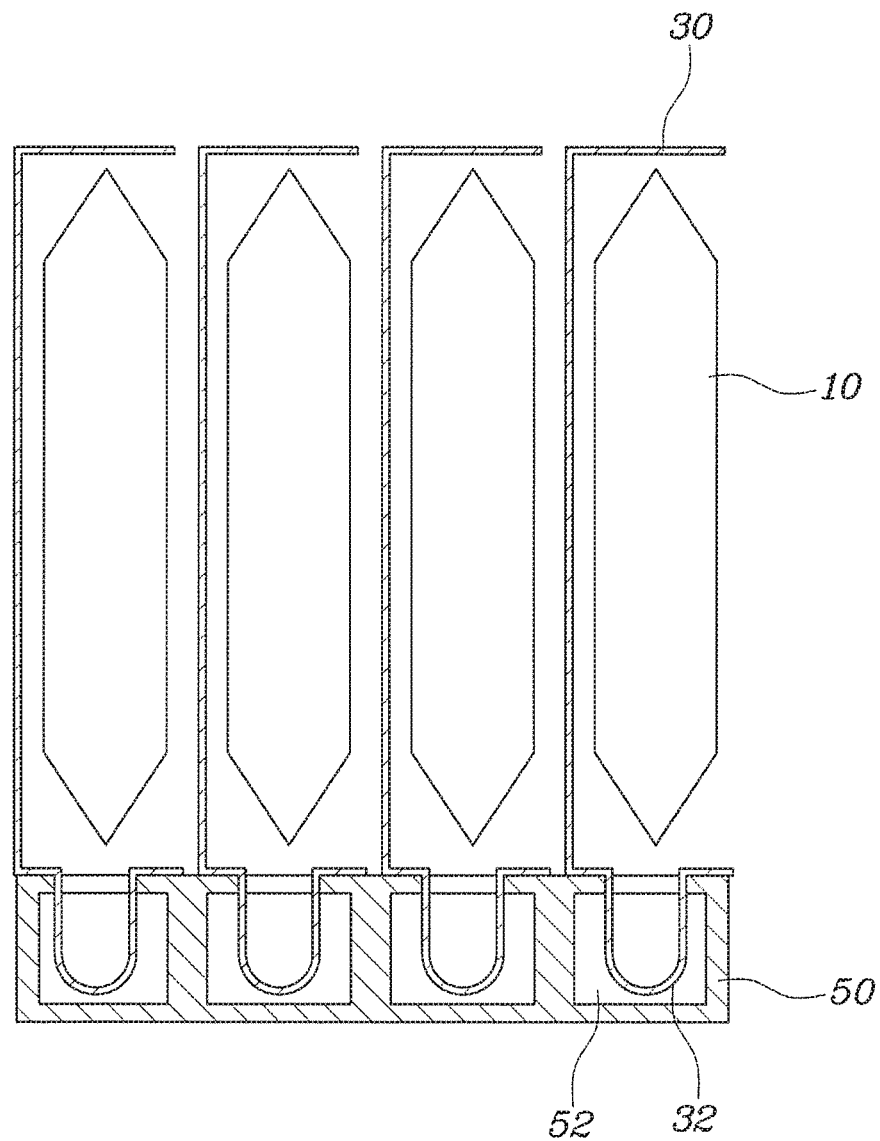
FIGS. 1 to 3 are views illustrating a structure for explaining a battery module according to one embodiment of the present disclosure.
Figure 2:
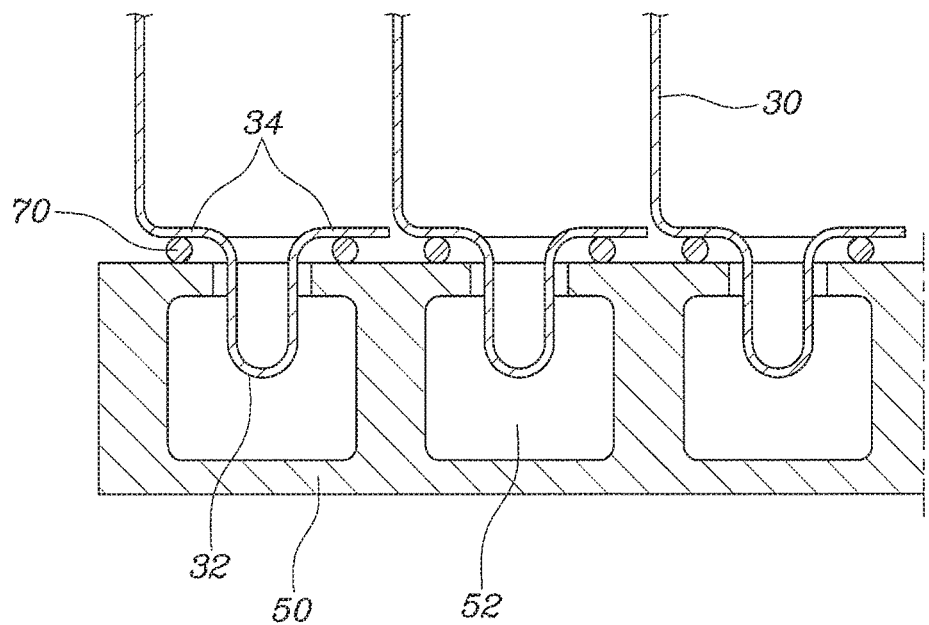
Figure 3:
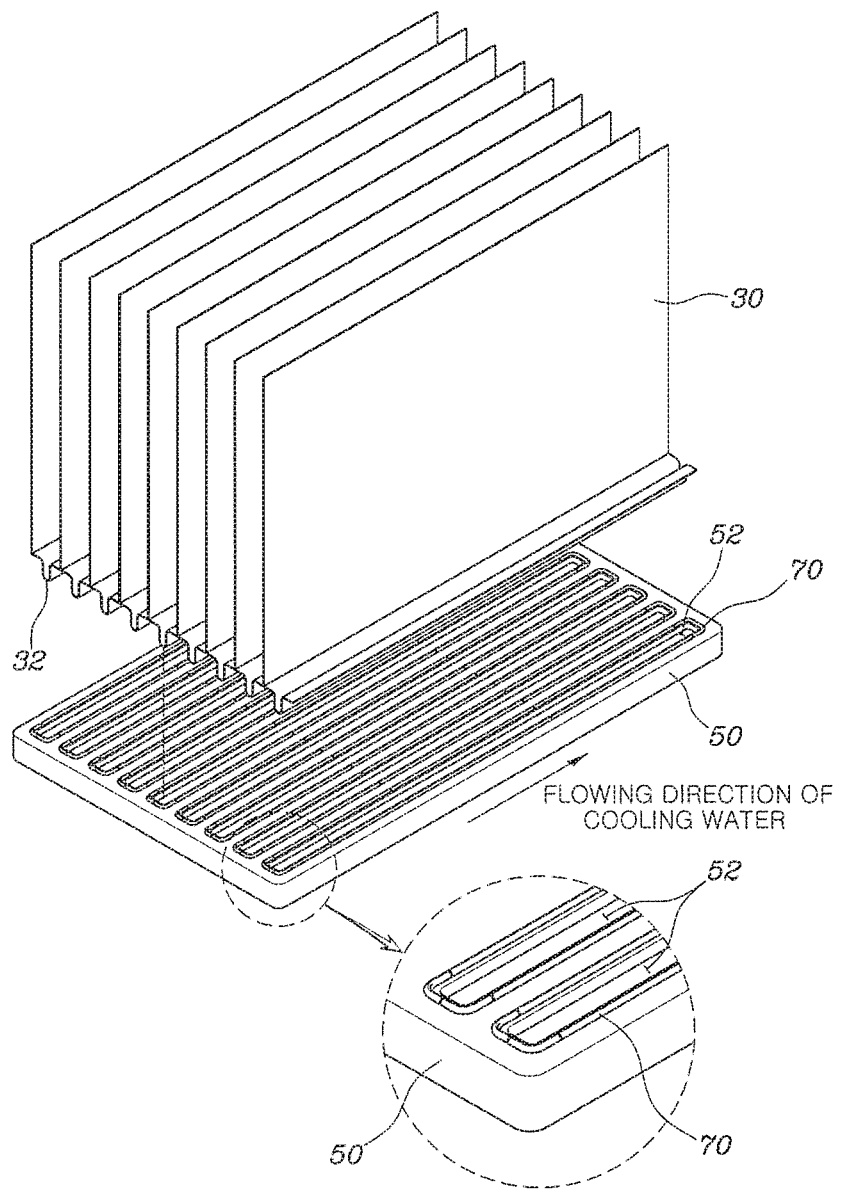

FIGS. 1 to 3 are views illustrating a structure for explaining a battery module according to one embodiment of the present disclosure.

First, referring to FIG. 1, a battery module according to one embodiment of the present disclosure is characterized by including a cell cover 30 close to a battery cell 10 and having one surface emitting heat of the battery cell 10; and a cooling channel portion 50 having a cooling channel 52 that a refrigerant flows formed therein and having one surface of the cooling channel 52 close to the one surface of the cell cover 30 to absorb heat of the battery cell 10, wherein in a contact region of the cell cover 30 and the cooling channel portion 50, the cell cover 30 has a protrusion portion 32 protruded in the direction of the cooling channel 52; and the cooling channel 52 has a penetration hole for inserting the protrusion portion 32 into an inner portion that the refrigerant flows.

Herein, the battery cell 10 has a structure that is received within the cell cover 30 and stacked at constant intervals.

A lower surface of the cell cover 30 has the protrusion portion 32 protruding in the direction of the cooling channel 52; and a shape of the protrusion portion 32 may be a shape bent as U or V, as one embodiment of the present disclosure. That is, as shown in FIG. 1, the lower surface of the cell cover 30 may be a shape bent as U or a V-acicular shape. As not shown in the figure, however, the protrusion portion 32 may have a rod-shaped structure as another embodiment. The protrusion portion 32 of the cell cover 30 according to various embodiments is inserted into the cooling channel 52 to directly contact with a refrigerant, thereby efficiently emitting heat that generates in the battery cell 10. Herein, the refrigerant includes cold water or cooling water.

The cooling channel portion 50 may have the penetration hole into which the protrusion portion 32 of the cell cover 30 may be inserted; and the penetration hole may have a diameter of degree into which the protrusion portion 32 of the cell cover 30 may be inserted. The foregoing is intended to compress and couple the cell cover 30 and the cooling channel portion 50 together with a gasket 70 as will be described later, thereby preventing leakage of the refrigerant.

By means of the structure of the cell cover 30 having the protrusion portion 32 and the cooling channel portion 50 having the penetration hole of the present disclosure, in the case that surface roughness or processing flatness of a contact surface of the water cooling plate that was a problem in the related art is not good, it is possible to resolve reduction of a contact resistance generated by non-uniform contact and inner bubbles between the cell cover and an interfacial thermal contact material and between the interfacial thermal contact material and the water cooling plate; to enhance assembly productivity due to removal of the interfacial thermal contact material; and to save manufacturing costs.

Further, it is possible to perform a direct thermal exchange between the cell cover 30 and the refrigerant of the cooling channel 52, thereby reducing a thermal resistance compared to the related art that applies an interfacial thermal contact material to a space between the cell cover and the cooling channel.

Referring to FIG. 2, a battery module according to one embodiment of the present disclosure may include a cell cover 30 having an upper surface, a side surface, and a lower surface formed to receive a battery cell 10 and having a protrusion portion 32 formed on the lower surface thereof; a cooling channel portion 50 having a cooling channel 52 that a refrigerant flows formed therein and having a penetration hole into which the protrusion portion 32 of the cell cover 30 is inserted formed on one surface of the cooling channel 52; and a gasket 70 positioned along a circumference of the penetration hole of the cooling channel portion 50.

Herein, the upper surface of the cell cover 30 is not shown in the figure, but may include the upper surface as shown in FIG. 1.

The cell cover 30 has an inner space with the upper surface, the side surface, and the lower surface formed to receive the battery cell 10; and in FIG. 2, the portion spaced between the cell covers as the portion for making a single cell cover 30 to bond therebetween in a manufacturing process, may be bonded to complete an assembly of one cell cover 30.

The lower surface of the cell cover 30 has one side portion forming the protrusion portion 32 and inserted into the penetration hole of the cooling channel portion 50 to directly contact with the refrigerant; and has the other side portion 34 contacting with an outer surface of the cooling channel portion 50.

The gasket 70, as a sealing gasket for watertight, is compressed and interposed between the other side portion 34 of the cell cover 30 and the outer surface of the cooling channel portion 50 along a circumference of the penetration hole of the cooling channel portion 50, thereby preventing leakage of cooling water when the cell cover 30 and the cooling channel portion 50 are coupled. A material of the gasket 70 may be an elastic material.

Referring to FIG. 3, a battery module according to one embodiment of the present disclosure may include a cell cover 30 having an upper surface, a lower surface, and a side surface formed to receive a plurality of battery cells, having a wall interposed between the battery cells, and having a plurality of protrusion portions 32 formed on the lower surface thereof; and a cooling channel portion 50 having a plurality of cooling channels 52 that a refrigerant flows formed therein and having a penetration hole into which the protrusion portion 32 of the cell cover 30 is inserted formed on one surface of each of the cooling channels 52.

Herein, the upper surface of the cell cover 30 is not shown in the figure, but may include the upper surface as shown in FIG. 1.

The cell cover 30, as an assembly of the cell cover capable of receiving a plurality of battery cells, has a plurality of protrusion portions 32 formed on the lower surface; and the protrusion portion 32, as one embodiment of the present disclosure, has a structure bent as U or V and is inserted into the penetration hole of the cooling channel portion 50 to directly contact with the refrigerant.

The cooling channel portion 50 may have a plurality of penetration holes into which the protrusion portion 32 of the cell cover 30 is inserted; and the penetration hole may have a diameter of degree into which the protrusion portion 32 of the cell cover 30 may be inserted. As described above, the foregoing is intended to compress and couple the cell cover 30 and the cooling channel portion 50 together with the gasket 70 to form a watertight structure, thereby preventing leakage of the refrigerant within the cooling channel 52.

The gasket 70 may be positioned along a circumference of each of the penetration holes of the cooling channel portion 50.

The cell cover 30, the gasket 70, and the cooling channel portion 50 are assembled in the direction from the cell cover 30 to the cooling channel portion 50 and then compressed and coupled to form a watertight structure capable of preventing leakage of the refrigerant of the cooling channel 52.

As described above, a battery module according to various embodiments of the present disclosure may improve a structure of a water cooling system for controlling heat that generates in a battery module within a battery system, thereby enhancing thermal transfer efficiency.

Further, it is possible to reduce power consumption by an air-conditioning load through the improvement of thermal transfer efficiency.

Further, it is possible to remove an interfacial thermal contact material between a water cooling plate and a cell cover, thereby enhancing assembly productivity and saving manufacturing costs.

Although an exemplary embodiment of the present disclosure has been described for illustrative purposes, those skilled in the art will appreciate that various modifications, additions and substitutions are possible, without departing from the scope and spirit of the invention as disclosed in the accompanying claims.

What is claimed is:

1. A battery module, comprising:
   a cell cover arranged adjacent to a battery cell, the cell cover having an upper surface, a side surface, and a lower surface, wherein the lower surface is configured to emit heat of the battery cell;
   a cooling channel portion having a plurality of cooling channels in which a refrigerant flows, the cooling channel portion being configured to absorb the heat of the battery cell, wherein the plurality of cooling channels are defined by an upper portion, a lower portion, and a plurality of side walls inside the cooling channel portion; and
   a gasket positioned along a circumference of each of a plurality of penetration holes of the cooling channel portion,
   wherein in a contact region of the cell cover and the cooling channel portion, the cell cover has a protrusion portion protruding toward the plurality of cooling channels,
   wherein the upper portion of the cooling channel portion has the plurality of penetration holes through which the protrusion portion extends into the plurality of cooling channels,
   wherein the lower surface of the cell cover includes:
      a first portion as part of the protrusion portion which is in direct contact with the refrigerant, without an interfacial thermal contact material between the cell cover and the plurality of cooling channels; and
      a second portion contacting an outer surface of the upper portion of the cooling channel portion and laterally extending from the side surface of the cell cover, the first portion extending from the second portion, and
   wherein the gasket is compressively interposed between the second portion of the cell cover and the outer surface of the cooling channel portion.

2. The battery module according to claim 1, wherein the protrusion portion has a U or V.

3. A battery module, comprising:
   a cell cover having an upper surface, a side surface, and a lower surface, wherein the cell cover receives a battery cell therein and has a protrusion portion on the lower surface;
   a cooling channel portion having:
      a plurality of cooling channels in which a refrigerant flows, wherein the plurality of cooling channels are defined by an upper portion, a lower portion, and a plurality of side walls inside the cooling channel portion;
      a plurality of penetration holes through which the protrusion portion extends into the plurality of cooling channels; and
   a gasket positioned along a circumference of each of the plurality of penetration holes, wherein the lower surface of the cell cover includes:
      a first portion as part of the protrusion portion which is in direct contact with the refrigerant, without an interfacial thermal contact material between the cell cover and the plurality of cooling channels; and
      a second portion contacting an outer surface of the upper portion of the cooling channel portion and laterally extending from the side surface of the cell cover, the first portion extending from the second portion, and
   wherein the gasket is compressively interposed between the second portion of the cell cover and the outer surface of the cooling channel portion.

4. The battery module according to claim 3, wherein the protrusion portion has a U or V shape.

5. A battery module, comprising:
   a cell cover having an upper surface, a lower surface, and a side surface, wherein the cell cover receives a plurality of battery cells therein, includes a plurality of walls interposed between the plurality of battery cells, respectively, and further includes a plurality of protrusion portions on the lower surface;
   a cooling channel portion having:
      a plurality of cooling channels in which a refrigerant flows, wherein the plurality of cooling channels are defined by an upper portion, a lower portion, and a plurality of side walls inside the cooling channel portion; and
      a plurality of penetration holes through which the plurality of protrusion portions extend, respectively, into the plurality of cooling channels, respectively; and
   a gasket disposed along a circumference of each penetration hole of the plurality of penetration holes,
   wherein the lower surface of the cell cover includes:
      a first portion as part of the plurality of protrusion portions, each of which is in direct contact with the refrigerant, without an interfacial thermal contact material between the cell cover and the plurality of cooling channel; and
      a second portion contacting an outer surface of the upper portion of the cooling channel portion and laterally extending from the side surface of the cell cover, the first portion extending from the second portion, and
   wherein the gasket is compressively interposed between the second portion of the cell cover and the outer surface of the cooling channel portion.

6. The battery module according to claim 5, wherein the plurality of protrusion portions have a U or V shape.

\* \* \* \* \*